Figure 8:
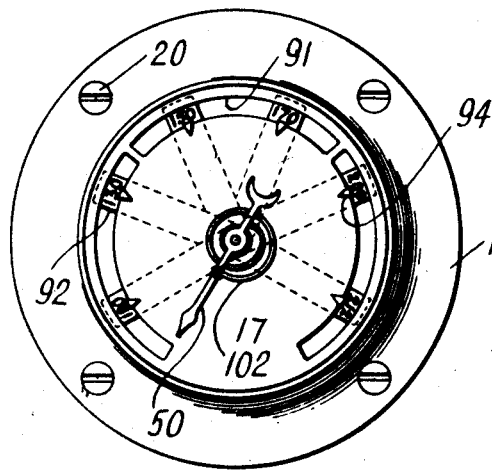

Sept. 14, 1926.  1,599,590
H. SCHLAICH
INDICATING INSTRUMENT
Original Filed June 18, 1917   2 Sheets-Sheet 1
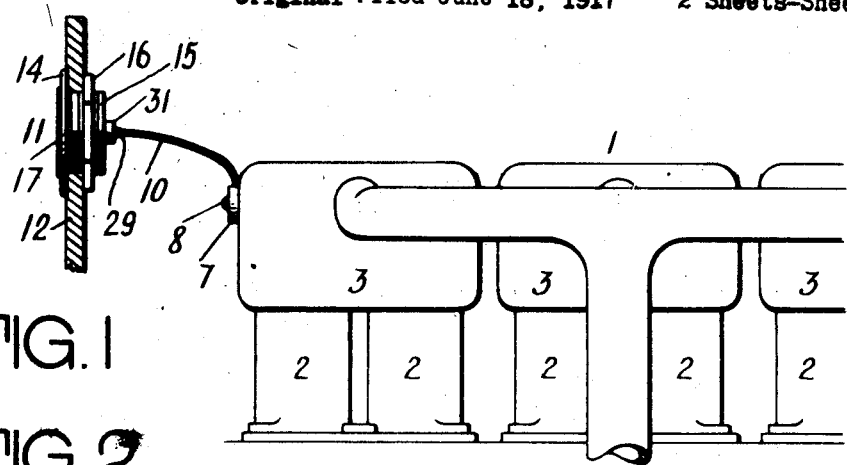
FIG.1
FIG.2
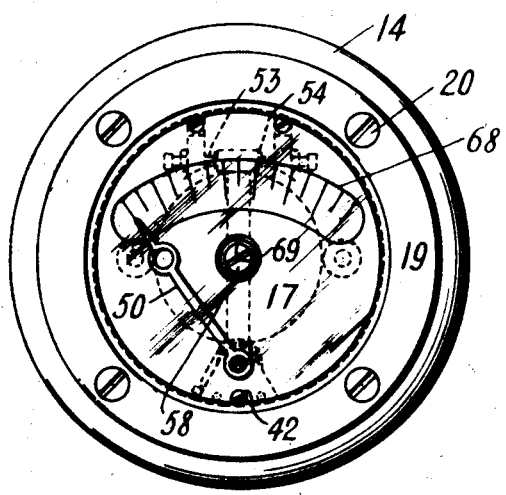
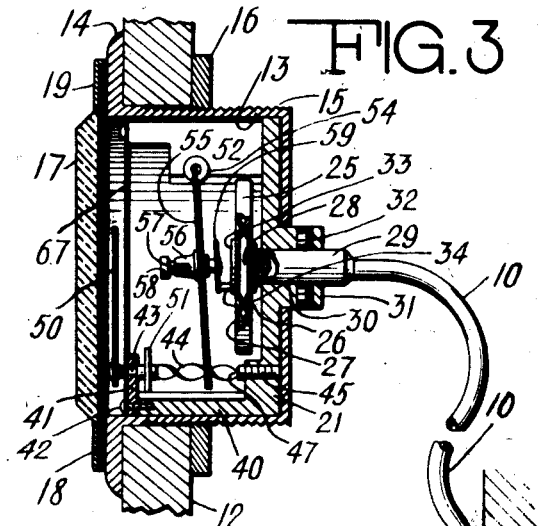
FIG.3
FIG.4
FIG.5
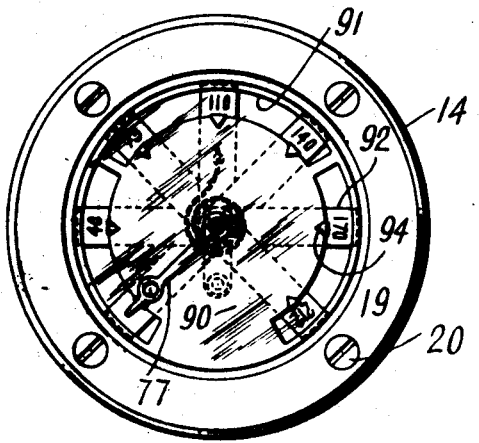
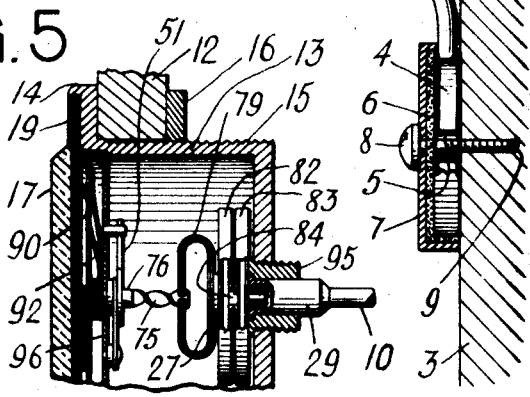
Inventor
Herman Schlaich
By his Attorney Sept. 14, 1926. 1,599,590
H. SCHLAICH
INDICATING INSTRUMENT
Original Filed June 18, 1917 2 Sheets-Sheet 2

Inventor
Herman Schlaich
By his Attorney
Edmund Quincy Moses

Patented Sept. 14, 1926.

1,599,590

UNITED STATES PATENT OFFICE.

HERMAN SCHLAICH, OF LONG ISLAND CITY, NEW YORK.

INDICATING INSTRUMENT.

Application filed June 18, 1917, Serial No. 175,244. Renewed July 15, 1925.

This invention relates to pressure or temperature indicating instruments and is particularly applicable to air or other expansible fluid thermometers but features of it may also be employed in connection with the construction of pressure gages for any purpose, particularly such as are utilized for the indication of low pressures. Instruments embodying the invention by reason of their freedom from influence by vibration, their lightness, sensitiveness, simplicity and adjustability are particularly adaptable to use for the measurement of pressures or temperatures in connection with aeroplanes, automobiles, motor boats, etc., as the severe conditions of such use do not affect their satisfactory operation. For purposes of illustration I have shown an instrument embodying the invention applied as a thermometer for indicating cylinder temperatures of an internal combustion engine of a motor vehicle, in connection with which I have also shown an improved mode of applying the thermo element to the engine, but the invention in so far as it relates to the indicating instrument per se is not limited to this use nor to this mode of application.

Heretofore it has been proposed to apply the thermo-element to the engine by inserting the same through a hole bored into the cooling system. This construction, while effective in securing a satisfactory thermal contact of the thermo-element therewith, is open to certain structural disadvantages due principally to the fact that the element is likely to be installed by garage men and others whose skill in this type of operation is apt not to be high. It will be evident that unless the thermo-element is properly secured in the bore made into the cooling system, leaks are very liable to develop; and, moreover there exists the possibility of the element, as for example the thermometer bulb or tube, becoming detached in use, due to the vibration of the engine. Also the further difficulty is presented that when, for whatever reason, the thermometer bulb or other temperature responsive instrument is removed, a hole is left in the cooling system which obviously must be stopped before the engine can be operated.

I have now observed that in instances I may obtain a satisfactory measure of the thermal condition of the engine by applying a temperature sensitive or temperature responsive instrument to the exterior of a wall of the cooling system behind which is cooling liquid in the state of having been affected by the temperature of the combustion chamber of a cylinder. In the form illustrated I apply a thermo-element to the jacket of the cylinder adjacent the combustion chamber, but obviously I may apply the thermo-element to any other part of the cooling system wherein the cooling liquid has been affected by the heat of a combustion chamber or chambers and before it has been cooled by the radiator. Thus by virtue of my invention the above mentioned difficulties incidental to tapping the cooling system are overcome in a simple and effective manner at the same time obtaining in a useful degree the thermal indication desired.

The present invention may likewise be applied to engines without water jackets or only partly jacketed by securing the thermo-element directly to the outside of the cylinder wall or other heated portion of an outer motor wall. In this manner an effective thermal connection of the temperature responsive instrument with the engine cylinder is achieved.

Figures 6, 7:
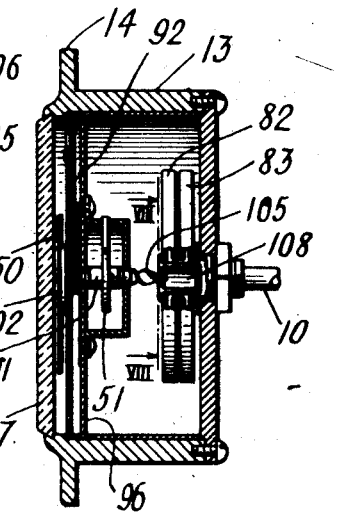
Figure 9:
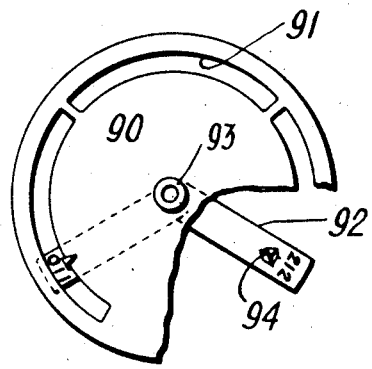
Figure 10:
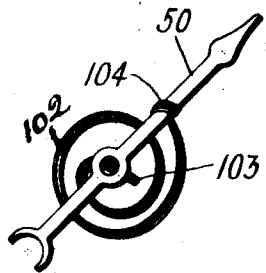
Figure 11:
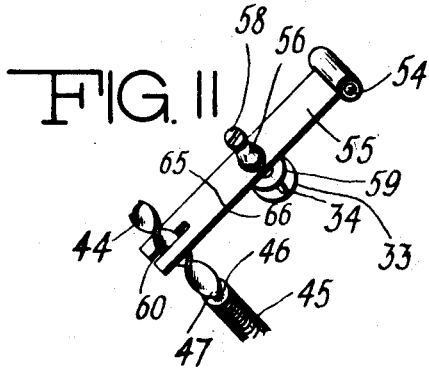
Figure 12:
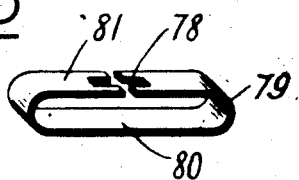

In the accompanying drawings which form a part of this specification, Figure 1 is a diagrammatic view in side elevation showing a part of an internal combustion engine of a motor vehicle and showing one form of the instrument applied thereto in such a manner as to indicate cylinder jacket temperatures. Figure 2 is a face view of the indicating instrument. Figure 3 is a vertical section through the instrument showing also the thermo element of the thermometer applied to the cylinder jacket wall. Figure 4 is a face view of a modified form of instrument. Figure 5 is a fragmentary vertical section of the instrument shown in Figure 4. Figures 6 and 7 are a face view and section respectively of another modified form of instrument, Figure 8 is a detailed sectional view on line VIII—VIII of Figure 7. Figure 9 is a fragmentary perspective view of a dial of the form shown in Figures 4 and 6. Figure 10 is a detailed view of the hand and compensating element shown in Figure 6. Figure 11 is a detailed perspective view of the compensating operating lever and associated parts employed in the form of instrument shown in Figures 2 and 3. Figure 12 is a perspective view of the compensating element employed in the form of instrument shown in Figures 4 and 5.

Referring in detail to the construction illustrated in Figures 1, 2 and 3 the invention is here shown as embodied in an air or gas thermometer applied to the indication of engine cylinder temperatures. The numeral 1 designates an internal combustion engine of a motor vehicle having cylinders 2 provided with water cooling jackets 3. A temperature-responsive element in the form of a bulb containing an expansive fluid is applied to the engine in any suitable manner. As illustrated I have made use of a bulb attached to the outer surface of the cylinder jacket wall. I preferably make the bulb in the form of a flattened annulus 4 which has a central opening 5. The bulb is covered on the outside with asbestos or other heat insulating covering 6, the bulb and covering being enclosed within a shell or cap 7 preferably of metal. The shell, covering and bulb are firmly held in position by a screw 8 screwed into a threaded hole 9 bored partly through the jacket wall. The screw is tightened up so as to clamp the bulb in close contact with the jacket wall so that it takes its temperature from the latter. A tube 10 of small or capillary bore and preferably flexible, leads from the bulb to the instrument 11 which is secured in any suitable position, for instance upon the vehicle dash 12 where it may be readily observed by the driver while operating the vehicle.

In the construction illustrated the instrument is provided with a casing 13 having a flange 14 adapted to engage the front of the dash, the body of the casing being externally threaded as indicated at 15, so that a collar or nut 16 may be screwed thereon for clamping the casing firmly in position. The front of the casing is arranged to be closed by a crystal 17 seated upon a packing ring 18 and clamped in position by a bezel 19 attached to the casing by screws 20. Removably mounted within the casing is a frame or base plate 21 carrying the operative parts of the instrument. These parts include a pressure sensitive element, an indicating element and operative connections between the two. In the form of instrument illustrated the pressure sensitive element comprises a box diaphragm 25 formed of two flexible corrugated discs 26 and 27 united at their outer edges. The disc 26 has a central opening 28 and is attached to a sleeve 29 which fits closely in the cylindrical opening 30 in a boss 31 formed on the frame 21, and capable of longitudinal and radial adjustment therein, suitable means for securing the sleeve in adjusted position being provided such for instance as the set screws 32. On the disc 27 is a reinforcing plate 33 carrying an eccentrically located projection or fulcrum 34 (see Figures 3 and 11). At one side of frame 21, preferably adjacent to the lower part of the wall of the casing 13 when the instrument is arranged in vertical position, is a bracket 40 carrying at its outer end a plate or bearing lug 41 secured in position in any suitable manner as by screws 42. Mounted in this plate is a spindle or arbor 43 which has attached to it a twist or helix 44. The end of this twist is supported in a bearing in the bottom of the frame 21. In the construction illustrated the bearing is formed by a screw 45, a cup shaped socket 46 in the end of which receives the conically pointed end 47 of the twist (see Figure 11). At its outer end, the spindle 43 carries an indicating hand 50 which is normally urged towards a zero position by means of a hair spring 51 attached to the spindle. Mounted on the frame or base plate opposite to the bracket 40 are a pair of spaced arms or bracket members 52 each of which carries an adjustable conically pointed screw 53 and between the points of these two pivot screws is an arbor 54 upon which is mounted the operating lever 55 (see Figures 2, 3, and 11). The operating lever carries a member adapted to be engaged by the fulcrum 34 on the diaphragm and is formed at its free end so as to operatively engage the twist 44. As illustrated the lever has affixed to it in line with the axis of the diaphragm a boss 56 which is internally threaded and transversely slotted at 57 and which carries an adjusting screw 58 to the lower end of which is attached an abutment disc 59, which normally rests against the fulcrum 34. At its outer end the lever is provided with a slot 60 adapted to receive the flattened helix or twist. Any increase in pressure in the box diaphragm 25 will result in forcing outwardly the disc 27 thereby causing the fulcrum 34 to press upon the abutment 59 and swing the lever 55 about the pivot screws 53 thereby causing the slotted end of the lever to move along the twist. This will obviously result in causing the twist to rotate, thus moving the indicating hand. Upon a reduction of pressure in the box diaphragm the hair spring 51 will rotate the hand in the reverse direction, the contact of the twist with the slotted end of the lever returning the lever as rapidly as the reduction in pressure of the diaphragm will permit. As the spring 51 is constantly active the same edges of the twist will always be in engagement with the same walls of the slot 60 so that there will be no lost motion in operating the hand. For this reason it is not necessary that the slot 60 shall fit tightly upon the twist but ample play may be allowed to permit freedom of movement without binding.

In order to compensate for changes in temperature within the instrument itself which will of course affect the expansion of the air or gas within the box diaphragm independently of the temperature of the bulb 4, the lever 55 is formed of superimposed strips of metal or other substance having different co-efficients of expansion; for instance, the outer strip 65 may be of brass while the inner strip 66 is formed of nickel. This construction, in accordance with the well known action of such a bi-metallic strip, results in the slight curvature of the lever in such a direction as to closely compensate for the changes in the expansion of the diaphragm due to local temperature changes.

In order that the position of the pointer may be readily observed and correct readings obtained, a dial having a suitable scale thereon is preferably provided. As illustrated, the dial plate 67 is supported upon plate 41 and the ends of the bracket arms 52, this dial being provided with a scale 68. The screw 58 provides means for making a zero adjustment of the hand with relation to the scale. In order that this adjustment may be readily made from time to time, if necessary, the dial plate preferably has an opening 69 through which the head of the screw may be reached when the crystal 17 is removed and without otherwise disturbing the instrument. The initial adjustment of the instrument may also be accomplished by loosening the screws 32 and moving the sleeve 29 and diaphragm in or out slightly as may be required. In many cases it is desirable to make an adjustment in the movement ratio existing between the diaphragm or other pressure-sensitive element and the movable indicating member. I am able to accomplish this result very simply by varying the effective lengths of the arms of the lever 55. In the particular construction illustrated, this result is achieved by the partial rotation of the diaphragm about the axis of the sleeve 29, which changes the position of the eccentric fulcrum 34, bringing it either nearer to or further from the pivot screws 53. In this way, it will be seen that the fulcrum may be caused to engage with the abutment disc 59 at any point between the position most remote from the pivot screws 53, as shown in Figure 3, and the nearest position to the pivot screws, which the fulcrum will occupy when the diaphragm is rotated through 180°. When the eccentric fulcrum is in the position shown in Figure 3, the movements of the index hand will be a minimum as compared with the movements of the diaphragm, the index hand moving furthest for a given displacement of the diaphragm when the fulcrum 34 is brought to a position nearest to the pivot screws 53. This adjustment is very desirable as absolute uniformity in the construction of the diaphragm is impossible and adjustment is necessary to secure a substantial degree of uniformity in the movements of the index hands of different instruments. This uniformity between different instruments is desirable as keeping the movements of the hand within the permissible limits of range of the instrument and also in making possible the use of a scale having standard divisions thereon, which may be stamped out with a die or printed. If this substantial uniformity were not obtainable, each instrument would have to be separately calibrated for several points in its range and have its individual scale marked by hand.

In Figures 4, 5, 9 and 12 a modified construction embodying features of the invention is shown. In accordance with this construction a helix or twist 75 is mounted directly on a central arbor 76 which carries the index hand 77. This helix projects through and engages with the side walls of the slots 78 formed in adjacent ends of the loop shaped compensating strip 79. This strip is made from two layers of material of different co-efficients of expansion such as an inner layer 80 of nickel and an outer layer 81 of brass and is mounted directly upon the outer flexible disc 27 of the box diaphragm 82 which is in communication with the source of pressure supply. With this construction I prefer to use two or more superimposed box diaphragms so as to obtain an increased movement; as illustrated I have shown connected with the box diaphragm 82 a second box diaphragm 83, the two being united by a central passage 84. The effect is merely to double the amount of movement obtained with a single box diaphragm. As the diaphragm expands it will be seen that the slots in the compensating strip will move along the twist causing the same to rotate the arbor and move the index hand. Local temperature changes which vary the pressure in the box diaphragm also act upon the compensating strip so as to cause it to bend, thus either moving its ends slightly outward away from the diaphragm or slightly in towards same, this movement compensating closely for the pressure variations due to local conditions. In order to insure correct scale readings corresponding to the various positions of the index hand, a hand marked dial laid off to correspond with the successive positions of the hand may be employed, but for many purposes such as for an engine temperature indicating instrument I prefer to use a dial construction provided with adjustable indicia, such for instance as that illustrated in figures 4 and 9. In the construction shown the dial plate 90 is provided with annularly arranged slots 91. A number of thin leaves 92 are secured to the underside of the dial in any suitable manner as by means of an eyelet 93 which is riveted over so as to hold all of the leaves to the dial and exert a sufficient pressure thereon so that the leaves will be retained in adjusted position by friction. Each leaf is provided with suitable figures or identifying indicia. Preferably also each leaf is provided with a bent over tongue 94 which engages the inner edge of the slot so as to hold the outer part of the leaf close to the underside of the dial where the numerals may be readily observed through the slot, the point of the tongue also serving as a division point corresponding with the numeral. For calibration, the instrument is subjected successively to the different conditions corresponding to the markings on leaves and the leaves moved about the central pivot until each is opposite the corresponding position of the hand. So far as the several points indicated by the leaves are concerned therefore the same accuracy is secured as with the hand marked dial and at very much less expense. An adjustment in the initial position of the diaphragm and compensating strip may be obtained by rotating the screw threaded sleeve 95 (see Figure 5) which will cause the diaphragm to be moved further away from or nearer to the support 96 for the arbor carrying the twist.

In Figures 6, 7, 8 and 10 I have shown another modification of my invention in which the compensation for local temperature variations is effected by mounting the hand loosely on the end of the arbor 101 and transmitting the movement from the arbor to the hand by means of a bimetallic compensating strip 102. The latter I have shown in the form of a spiral the inner end of which 103 is made fast to the arbor and the outer end 104 to the hand. Local changes in temperature will cause the strip to coil or uncoil to a limited extent thus modifying the position of the hand with relation to its arbor. In the construction shown the arbor carries the twist 105 which works in a slot 106 in a plate 107 located over the chamber 108 set into a box diaphragm. The chamber is simply to give clearance for the portion of the twist projecting beyond the plate 107. The operation of the box diaphragm is the same as that previously described, the expansion of the diaphragm moving out the plate 107 and thus causing the twist and index hand to be rotated. In this instance I have shown the twist 105 as having a pitch decreasing from the end adjacent the diaphragm outwardly therefrom, the effect of which decrease is to cause the twist to rotate more quickly as the diaphragm expands. This results in giving the index hand a greater movement during the upper ranges of the scale which opens out this part of the scale and makes reading of the same easier. Obviously the variation in the pitch may be arranged so as to open any part of the scale.

In an instrument for indicating the cylinder temperatures of an internal combustion engine, the arrangement of the twist as described so as to increase the degree of movement of the index hand through the upper range of the scale is particularly desirable as the higher temperatures indicated by the instrument correspond to critical temperatures of the engine cylinders beyond which it usually is not safe to operate the engine for any length of time. Accordingly, the hand may be caused to have an extended and relatively rapid movement at or near the danger point, whereby it will act as a danger signal and clearly call the attention of the operator to the fact that excessive temperatures have been reached. The variable pitch twist may be employed in like manner in connection with the other forms of instrument illustrated.

While I have shown and described in detail certain preferred embodiments of my invention as illustrative of the best modes now known to be of practicing the same, it is to be understood that I do not intend to limit myself to these specific embodiments but intend to cover my invention broadly in whatever form its principle may be employed.

Having thus described my invention, I claim:

1. In an instrument of the character described, the combination of a pressure-sensitive actuating element, a bi-metallic compensating lever arranged to be actuated by said element, a twist in operative engagement with a part of said bi-metallic lever and rotatable indicating means actuated by said twist 2. In an instrument of the character described, the combination of a flexible diaphragm, a bi-metallic lever pivoted to a fixed support at one end and carrying means intermediate its ends bearing against said diaphragm, a twist operatively engaged with the free end of said bi-metallic lever and rotatable indicating means carried by said twist.

3. In an instrument of the character described, the combination of a flexible diaphragm, a bi-metallic compensating lever operatively engaged with said diaphragm and having a notched or bifurcated portion, a flattened twisted member engaged by said bifurcated portion of the lever, fixed bearings in which said member is journaled and rotatable indicating means carried by said member.

4. In an instrument of the character described, the combination of indicating means, a twist, a lever fulcrumed at one end and slotted at the other, said slotted end having operative engagement of said twist, a flexible diaphragm mounted so that it may be rotated, a fulcrum mounted on said diaphragm eccentric to the axis of rotation thereof, and means on said lever between the ends thereof engaging said fulcrum.

5. In an instrument of the character described, the combination of a casing, a crystal for closing the front of said casing, a frame mounted in said casing and comprising a back plate and forwardly projecting upper and lower brackets, a dial plate carried by the outer ends of said bracket, an arbor carried by the lower bracket, an index hand mounted on said arbor between said crystal and dial plate, a twist connected to said arbor and extending rearwardly from the same adjacent to said lower bracket, a bi-metallic lever pivoted to said upper bracket, extending across said casing and having a slotted end engaging with said twist, an abutment carried by said lever between the ends thereof, an adjusting screw for adjusting the position of said abutment towards or from the lever, a box diaphragm located substantially parallel to said back plate and between the same and said lever, said box diaphragm being mounted on a sleeve projecting through an opening in the back of said back plate, said sleeve and box diaphragm being capable of rotation about an axis normal to said back plate and a fulcrum eccentrically mounted on said diaphragm and adapted to engage the abutment on said lever.

6. In an instrument of the character described, the combination of indicating means, a box diaphragm, and operative connections between the diaphragm and indicating means, said diaphragm being adjustably supported whereby it may be moved so as to effect an adjustment of the indicating means.

7. In an instrument of the character described, the combination of indicating means, a twist operatively connected therewith, a box diaphragm, operative connections between said box diaphragm and said twist, and means whereby said box diaphragm may be rendered movable in a direction substantially parallel to the axis of said twist so as to effect an initial adjustment of the indicating means.

8. In an instrument of the character described the combination of indicating means, a box diaphragm, and operative connections between said diaphragm and indicating means, said diaphragm being adjustably supported whereby it may be moved in an axial direction and may be rotated about its axis, said operative connections including means for effecting an initial adjustment of the indicating means when said diaphragm is moved in an axial direction and for varying the movement ratio between the diaphragm and the indicating means when the diaphragm is rotated about its axis.

9. A temperature responsive element for thermometers, comprising a flattened annular bulb, and a clamping screw for securing said bulb in contact with a surface of the engine, said screw passing through the central opening of the annulus and screwing into a threaded socket in the engine wall.

10. In temperature indicating means for internal combustion motors of motor vehicles, the combination with the motor, of a flattened fluid-filled bulb, means for securing said bulb with a flattened side in intimate thermal conductive contact with a heated portion of an outer motor wall, said means comprising a metallic casing extending over the bulb and secured to the motor wall, and a layer of non-conducting material between said casing and the bulb, an indicating instrument located in a position to be observed by the driver when operating the vehicle, and a flexible tube connecting said instrument and bulb.

11. A thermometer comprising a chamber having a heat-conducting wall constructed to fit upon the outer surface of an object whose temperature is to be measured, means for holding said chamber with said wall in intimate contact with said object, a heat-insulating covering for the opposite wall of said chamber, said chamber containing an expansible fluid, a pressure controlled gage for indicating temperature, and a tube connecting said chamber with said gage.

12. A thermometer comprising a chamber having a heat-conducting wall constructed to fit upon the outer surface of an object whose temperature is to be measured, means for holding said chamber with said wall in intimate contact with said object, a heat-insulating covering for the opposite wall of said chamber, a shell member surrounding said heat-insulating covering, said chamber containing an expansible fluid, a pressure controlled gage for indicating temperature, and a tube connecting said chamber with said gage.

13. A temperature responsive element for thermometers comprising a bulb flat on one side and having an opening therethrough transverse to said side, a casing for said bulb having an opening registering with that of the bulb, an insulating lining between said casing and bulb, and an attaching device passing through the openings in the casing and bulb.

14. A temperature indicating means for internal combustion motors of motor vehicles comprising a temperature responsive element, means for fixedly securing said element in intimate thermal conductive contact with the exterior of a wall of the cooling system on the interior of which is cooling liquid affected by the temperature of the combustion chamber of a cylinder and before it has been cooled by the radiator, said temperature responsive element being excluded from contact with the cooling liquid by said wall, an indicating instrument located in a position to be observed by the driver when operating the vehicle and an operative connection between the temperature responsive element and the indicating instrument whereby the indicating instrument will be constantly affected by the temperature responsive element to give indication of varying thermal conditions of normal operation of the engine as well as indication of abnormal thermal conditions of said engine.

15. A thermometer comprising a chamber having a heat conducting wall constructed to fit upon the outer surface of an object whose temperature is to be measured, means for fixedly securing said wall of said chamber and said object in intimate contact with one another, a heat insulating covering for a wall of said chamber, not in contact with the surface of said object, said chamber containing a temperature responsive element, an indicating instrument located in a position to be observed by the driver when operating the vehicle and an operative connection between the temperature responsive element and the indicating instrument whereby the indicating instrument will be constantly affected by the temperature responsive element to give indication of varying thermal conditions of normal operation of the engine together with indication of abnormal thermal conditions of said engine.

16. A thermometer comprising a chamber having a heat conducting wall constructed to fit upon the outer surface of an object whose temperature is to be measured, said chamber and object having mutually conforming surfaces over an extended contact area, means for fixedly securing said conforming surfaces firmly against one another, a heat insulating covering for a wall of said chamber, not in contact with the surface of said object, said chamber containing a temperature responsive element, an indicating instrument located in a position to be observed by the driver when operating the vehicle and an operative connection between the temperature responsive element and the indicating instrument whereby the indicating instrument will be constantly affected by the temperature responsive element to give indication of varying thermal conditions of normal operation of the engine together with indication of abnormal thermal conditions of said engine.

HERMAN SCHLAICH.